C. B. HODGES.
METHOD OF OPERATING COMPOUND COMPRESSED AIR ENGINES.
APPLICATION FILED JUNE 11, 1909.
953,334.
Patented Mar. 29, 1910.
2 SHEETS—SHEET 1.
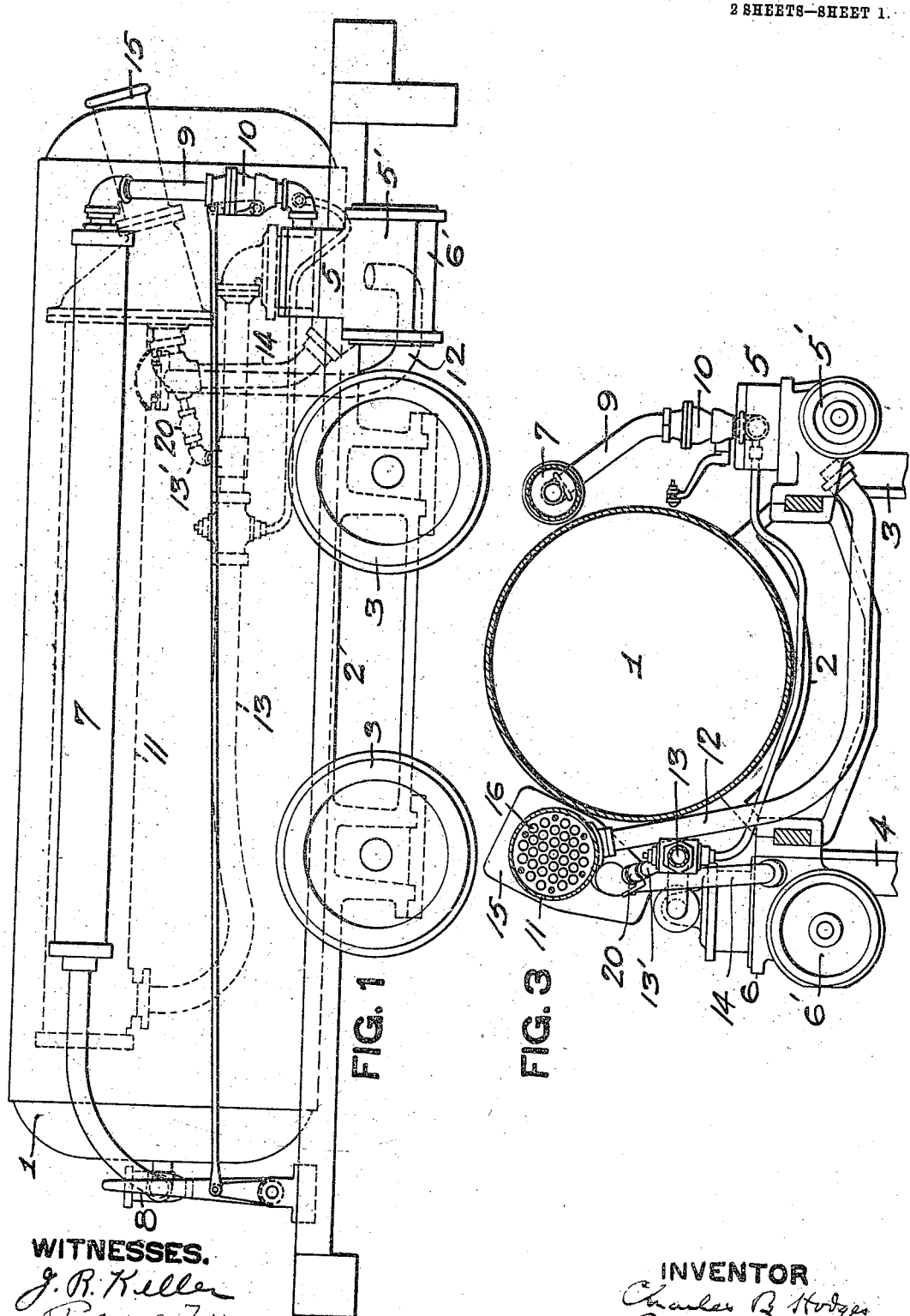
WITNESSES.
INVENTOR

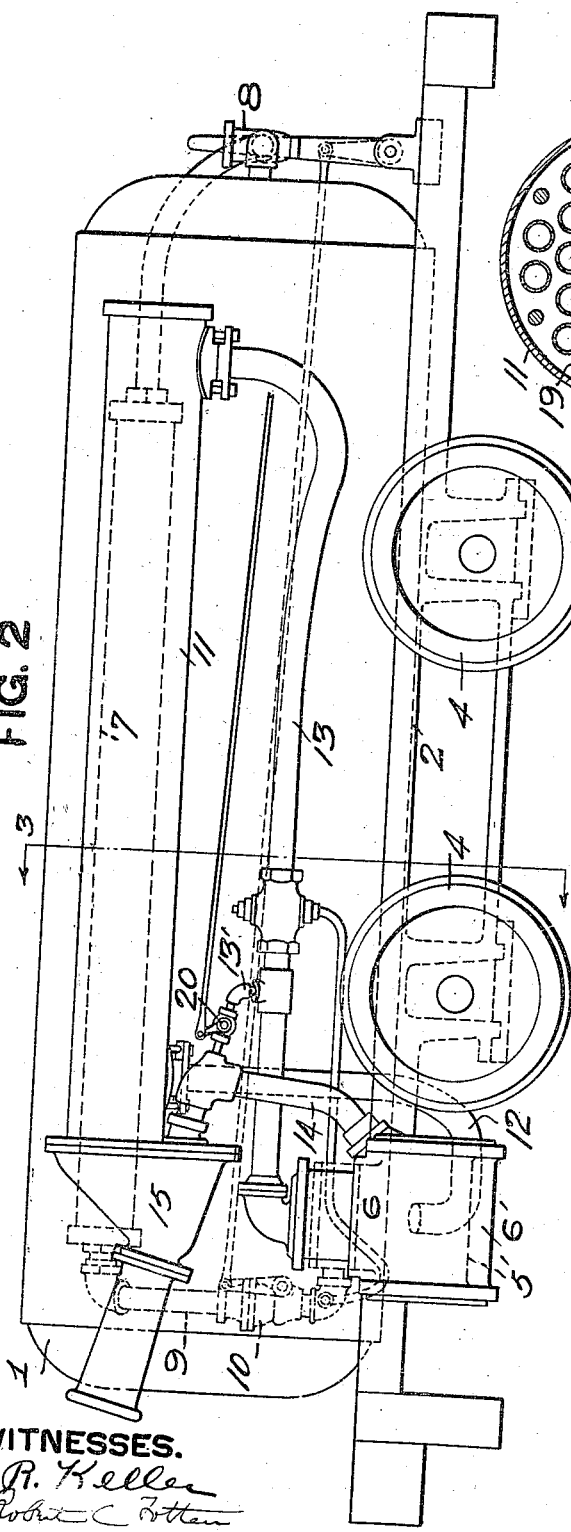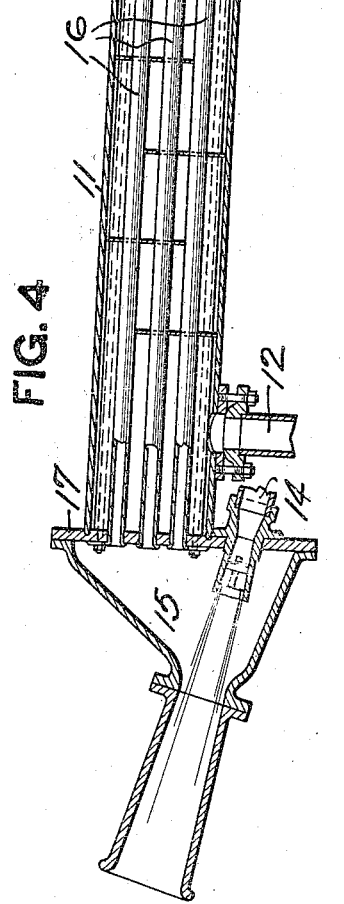

UNITED STATES PATENT OFFICE.

CHARLES B. HODGES, OF PITTSBURG, PENNSYLVANIA, ASSIGNOR TO H. K. PORTER COMPANY, OF PITTSBURG, PENNSYLVANIA, A CORPORATION OF PENNSYLVANIA.

METHOD OF OPERATING COMPOUND COMPRESSED-AIR ENGINES.

953,334.  Specification of Letters Patent.  Patented Mar. 29, 1910.

Application filed June 11, 1909. Serial No. 501,641.

*To all whom it may concern:*

Be it known that I, CHARLES B. HODGES, a resident of Pittsburg, in the county of Allegheny and State of Pennsylvania, have invented a new and useful Improvement in Methods of Operating Compound Compressed-Air Engines; and I do hereby declare the following to be a full, clear, and exact description thereof.

My invention relates to methods of operating compound compressed air engines, its object being to so operate the same as to obtain increased power from the compressed air.

It consists, generally stated, in operating such compressed air engines by carrying the compressed air through and expanding it in one cylinder and thereby reducing it below lowest atmospheric temperature, re-heating the exhaust air when confined and at low pressure by extended exposure thereof to air heating at atmospheric temperature and thereby increasing the volume thereof and carrying the re-heated air through a low pressure cylinder.

The invention also includes the utilization of the compressed air in such way as to obtain approximately the proper balance as between the two cylinders of a compound compressed air engine so that the power generated in each will be approximately the same according to the pressure of the air as utilized in the respective cylinders.

In the accompanying drawings Figure 1 is a side view of a locomotive engine adapted for the use of the invention, and Fig. 2 is a side view partly broken away on the opposite side thereof; and Fig. 3 is a cross section on the line 3—3 Fig. 2, and Fig. 4 is a longitudinal section partly broken away of the preferred form of the interheater and Fig. 5 is a cross section of said interheater.

To accomplish the above results in the apparatus best adapted for the purpose and as applied to, for example, a locomotive engine, I employ the main air reservoir 1 supported on a suitable locomotive truck or underframe 2 mounted on the driving wheels 3 and 4 on the two sides of the locomotive. On the high pressure side, as shown in Fig. 1, the high pressure engine is shown at 5 connected up to the wheels 3, while on the other side the low pressure engine is shown at 6 connected to the wheels 4. The auxiliary reservoir 7 is supported on the main reservoir 1 and air is fed thereto from the main reservoir through a suitable reducing valve 8, bringing the air to proper pressure for entrance to the valve box of the high pressure cylinder 5'. The pipe 9 leads to the high pressure cylinder and has located therein the operating or throttle valve 10.

From the high pressure cylinder 5' the air passes to the air inter-heater 11 through the pipe 12 and from the same through the pipe 13 to the valve box of the low pressure cylinder 6', the air escaping therefrom through the pipe 14 which preferably exhausts into the nozzle 15 of the air inter-heater 11 to induce a draft through the same for the re-heating of the air discharged from the high pressure cylinder. The best results are obtained when the air enters the high pressure cylinder at a pressure of about 250 pounds and discharges therefrom at a pressure of about 50 pounds, and is raised by reheating by atmospheric heating to about four volumes of the original compressed air, so that the low pressure cylinder has a cubical contents of about four times that of the high pressure cylinder; for example, the high pressure cylinder having a diameter, say, of about 5 inches, and the low pressure cylinder having a diameter of about 10 inches.

Any suitable receptacle for reheating the compressed air by the reheating action of atmospheric air between the high pressure cylinder and low pressure cylinder may be employed, and the travel of the atmospheric air over the surfaces of such receptacle can be induced in any suitable way. The preferred form of inter-heater is illustrated in Figs. 2 and 3, being supported in horizontal position on the side of the main reservoir, extending for practically the full length thereof, being of small diameter and relatively great length to provide for a relatively strong or violent draft of air through the tubes thereof for re-heating of the compressed air. In the best form, as heretofore used when the engines are ten inches stroke and the cylinders five and ten inches in diameter respectively, the inter-heater is about 7 feet long, 8 inches in inside diameter, and is filled with a large number of tubes, for example, about thirty 1-inch tubes, as at 16, seated in the end walls 17, 18 of the inter-heater, the inter-heater having a suitable series of baffles 19 between the tubes 16 so as to cause the compressed air to be re-heated to travel in circuitous course around the re-heating tubes. The atmospheric air is carried through the tubes 16 by the draft induced within the exhauster nozzle 15, such as by the discharge of the exhaust air from the low pressure cylinder through the pipe 10. Air under pressure may also be employed for inducing the draft such as by the pipes 19 leading from the pipe 13, and controlled by the valve 20.

In the practice of the invention with the apparatus above described, the compressed air is stored at a relatively high pressure, say, about 800 pounds, within the main reservoir 1 and it is maintained within the auxiliary reservoir 7 at the desired pressure for the operation of the engine, say about 250 pounds. Upon the operation of the throttle valve 10 it passes into the high pressure cylinder 5' and does work therein, escaping therefrom at a relatively low pressure, for example, in the best practice at a pressure of about 50 pounds. The sudden and rapid expansion of the air within said high pressure cylinder causes a violent drop in the temperature of the air, bringing it below lowest atmospheric temperature—i. e., reducing it far below the temperature of the surrounding atmosphere. For example, if it enters at average atmospheric pressure of 60° Fahrenheit, the air passes therefrom at a temperature below lowest atmospheric temperature, the reduction in temperature being usually about 140° F., so that it is brought to a temperature of about 80° below zero F. At such low temperature the volume of air is insufficient to fill the low pressure cylinder at a pressure of 50 pounds and if utilized at such low temperature the apparatus will be quickly clogged through the gathering of frost, freezing of the lubricant, and from other causes. I therefore discharge the exhaust from the high pressure cylinder into a suitable receptacle and utilize the atmospheric air for re-heating the compressed air when so confined by carrying the atmospheric air over the exposed surfaces of such receptacle, for example, through the tubes of the inter-heater 11, preferably using for this purpose the exhaust air from the low pressure cylinder. By such exhaust a violent draft of atmospheric air is carried through the tubes of the inter-heater, and as the compressed air travels around said tubes it is re-heated by the atmospheric air and raised thereby approximately to or approaching atmospheric temperature, and it is thereby increased in volume, a sufficient volume for utilization within the low pressure cylinder of relatively greater cubic contents than the high pressure cylinder being obtained.

In practice I find that by making the low pressure cylinder about four times the cubical contents of the high pressure cylinder, as above stated, I am enabled to utilize the compressed air therein at the pressure of 50 pounds per square inch and generate about the same power as that generated within the high pressure cylinder, so as to maintain the proper balance of power in the two cylinders as applied to the driving shaft or shafts of the locomotive or other engine. For example, where the high pressure air is reduced in the high pressure cylinder from 250 to 50 pounds per square inch, the unbalanced pressure per square inch utilized in such cylinder is 200 pounds, while in the low pressure cylinder at 50 pounds and four times the piston area the total pressure exerted is the same. Of course this may be varied as found desirable, but within practicable limits the expansion within the high pressure cylinder is such as to reduce the temperature of the air at least 100° F., and the low pressure cylinder is made of such size as to utilize the compressed air according to the relative reduction in pressure, and the air is re-heated within the inter-heater to bring it to the proper volume according to the relative sizes of the high pressure and low pressure cylinders. By thus providing for the rapid expansion of the high pressure air and providing by atmospheric re-heating for the necessary increase of volume of the expanded air to provide for its utilization within the low pressure cylinder, practically all of the power to be generated from the compressed air is obtained and I am enabled to utilize atmospheric heating through the carrying of the expanded compressed air through the inter-heater in such way as to give proper exposure to the atmospheric air for the re-heating thereof, and such re-heating is obtained without the expenditure of power other than that sufficient to expose the compressed air to proper atmospheric re-heating between the high pressure cylinder and the low pressure cylinder, and at the same time to balance the power obtained so as to utilize the force generated upon the same driving shaft and balance that power in the operation of the engine, so utilizing practically all the power to be generated from the compressed air.

In order to insure a sufficient draft through the inter-heater to re-heat the air entering the same from the high pressure cylinder and increase its volume to the full extent to obtain the desired power therefrom in the low pressure cylinder, instead of or in addition to the use of the exhaust air from the low pressure cylinder, I may introduce a jet of air under pressure into the nozzle of the inter-heater; for example, by means of the pipe 13' taken from the pipe 13 as above described.

The general apparatus employed for the practice of the method set forth herein is disclosed in Letters Patent No. 868,560, granted to me October 15, 1907.

The special method of inducing a current of air at atmospheric temperature over the surface of the confining receptacle by a jet of air at as high pressure as that entering the low pressure cylinder, for example as that passing through the pipe 13', forms the subject matter of a separate application filed by me of even date herewith, Serial No. 501,642.

The specific apparatus illustrated in this application and involving the employment of an air interheater having a long contracted body of small diameter filled with a large number of tubes of small diameter and a pipe carrying air from the pipe leading to the low pressure cylinder for inducing a draft over the exposed surface of the air interheater, forms the subject matter of an application filed by me of even date herewith, Serial No. 501,643.

What I claim is:

1. The method of operating compressed air engines, consisting in carrying the air at high pressure through and expanding it in one cylinder and thereby reducing it below lowest atmospheric temperature, re-heating the exhaust air from said cylinder when confined by extended exposure to air heating at atmospheric temperature and thereby increasing the volume thereof and its capacity to generate power, and carrying the re-heated air through a low pressure cylinder.

2. The method of operating compressed air engines, consisting in carrying air at high pressure through one cylinder and thereby reducing it below atmospheric temperature, confining such air within a receptacle and by a jet of air under pressure inducing a current of air at atmospheric temperature over the exposed surface of such receptacle and thereby reheating and increasing the volume of such exposed air, and carrying the reheated air through a low pressure cylinder.

3. The method of operating compressed air engines, consisting in carrying the air at high pressure through and expanding it in one cylinder and thereby reducing it below lowest atmospheric temperature, re-heating the exhaust air from said cylinder when confined by extended exposure to air heating at atmospheric temperature and thereby increasing the volume thereof, and carrying the re-heated air through a low pressure cylinder, and so discharging the exhaust therefrom as to induce a draft over the exposed surfaces of the receptacle confining the exhaust air from the high pressure cylinder.

4. The method of operating compressed air engines, consisting in carrying the air at high pressure through and expanding it in one cylinder and thereby reducing it below lowest atmospheric temperature and re-heating the exhaust air when confined by extended exposure thereof to air at atmospheric temperature and thereby increasing it to the necessary volume to generate substantially like power within another cylinder of greater cubical contents and carrying such re-heated air through such low pressure cylinder.

In testimony whereof, I the said CHARLES B. HODGES have hereunto set my hand.

CHARLES B. HODGES.

Witnesses:
ROBERT C. TOTTEN,
J. F. WILL.